(12) United States Patent
Godwin, Sr. et al.

(10) Patent No.: US 7,770,980 B2
(45) Date of Patent: Aug. 10, 2010

(54) DUMP VEHICLE

(75) Inventors: James P. Godwin, Sr., Dunn, NC (US); Fernie E. Williams, Fuquay-Varina, NC (US)

(73) Assignee: Champion Hoist & Equipment Co., LLC, Dunn, NC (US)

( * ) Notice: Subject to any disclaimer, the term of this patent is extended or adjusted under 35 U.S.C. 154(b) by 657 days.

(21) Appl. No.: 11/742,906

(22) Filed: May 1, 2007

(65) Prior Publication Data

US 2008/0272641 A1 Nov. 6, 2008

(51) Int. Cl.
*B65G 67/50* (2006.01)
(52) U.S. Cl. .......................................... 298/10
(58) Field of Classification Search ............... 298/10, 298/22 R, 19 R, 17 R
See application file for complete search history.

(56) References Cited

U.S. PATENT DOCUMENTS

| | | | | |
|---|---|---|---|---|
| 2,837,312 A | * | 6/1958 | Troche | 254/423 |
| 2,849,255 A | * | 8/1958 | Pasker | 298/22 J |
| 2,894,785 A | * | 7/1959 | Yackel | 298/22 R |
| 3,362,683 A | * | 1/1968 | Hansen | 254/423 |
| 3,617,090 A | * | 11/1971 | Huffman et al. | 298/22 J |
| 4,657,471 A | * | 4/1987 | Shinoda et al. | 414/663 |
| 4,865,295 A | * | 9/1989 | Holloway | 254/423 |
| 4,925,165 A | * | 5/1990 | Sketo | 267/221 |
| 5,013,011 A | * | 5/1991 | Halloway | 254/423 |
| 7,090,305 B2 | * | 8/2006 | Thorvaldson, Sr. | 298/10 |

* cited by examiner

*Primary Examiner*—Hilary Gutman
(74) *Attorney, Agent, or Firm*—Coats & Bennett, P.L.L.C.

(57) ABSTRACT

A dump vehicle comprising a chassis and a dump bed with a cylinder laterally constrained by a stabilizer. The cylinder is supported on a support structure and pivotably connected thereto and to the dump bed. The stabilizer includes a retainer extending at least partially around the cylinder and having arms extending downwardly from the retainer and outwardly from the cylinder. The stabilizer constrains the cylinder laterally, at least partially absorbing side loads imposed on the cylinder.

21 Claims, 6 Drawing Sheets

DUMP VEHICLE

FIELD OF THE INVENTION

The present invention relates to dump vehicles, and more particularly to actuation systems mounted on dump vehicles for raising and lowering dump beds.

BACKGROUND

Various kinds of dump vehicles are used in agriculture, construction, mining and other industries. In general, such vehicles are used to, at one location, receive materials such as produce, soil, ore, gravel, and construction debris for transport and off-loading to another site. A common example of such a vehicle is a dump truck. Other examples include dump trailers, sleds, hoppers and the like.

A typical dump truck includes a chassis with a dump bed mounted thereto so that the bed can receive materials to be transported while in a generally horizontal position. The dump bed is movably mounted to the chassis so that the materials received can subsequently be unloaded by rotating or tilting the bed, allowing the materials to flow out of the bed. Typically, such dump beds are hinge mounted with the hinge being located at a rearward portion of the chassis. The bed is tilted typically by a hydraulic cylinder located near a forward portion of the bed, causing the bed to rotate about the hinge from a horizontal position to a tilted position.

The hydraulic cylinder is pivotably mounted, directly or indirectly, to the chassis and to the dump bed so that as the cylinder is extended, the bed is pushed upward and pivots about its hinge. Such cylinders are generally powered by a PTO-driven pump which may be energized to pump oil from an onboard reservoir into the cylinder to cause it to extend, and a valving system is employed to permit oil to return to the reservoir as the cylinder retracts.

Due to the nature of the material typically transported in dump trucks and to the terrain over which they operate, it is common to have unbalanced loads experienced by cylinders used in dump trucks. These unbalanced loads give rise to unwanted bending moments which may severely affect the performance of the dump truck.

One example of an unbalanced load is evident when the load is not uniformly distributed within the bed. For example, when hauling debris, the debris may contain a mixture of soil, concrete, steel, framing materials, stumps, tree limbs, and leaves. A heavy concrete slab that winds up in a load disposed near one side wall of the dump bed, otherwise filled with tree limbs and relatively light debris, will cause a greater downward force on that side of the bed. Typically the cylinder is positioned near a transverse center of the bed and must therefore resist not only the vertical load but also the bending moment due to the concrete slab being disposed near one side wall of the bed.

Another example of an unbalanced load is the condition that arises due to unlevel terrain. Even where the material loaded in the dump bed is uniformly distributed and of uniform density, if the dump truck is on a transverse incline while dumping, side loads will occur due to gravity.

The bending moments generated by side loads in such situations are often very damaging to the hydraulic cylinder and to the pivotable connections of the cylinder to the dump bed and chassis. The bending moments generated by side loads will tend to bend the cylinder. In the least troublesome case, such cylinder bending may result in seal damage to the cylinder that then results in oil leakage and reduced performance. In the more catastrophic case, the bending moment may result in cylinder failure by breaking. Generally, in hydraulic cylinder design and selection, cylinders may be employed that are significantly over-designed to resist the side load moments, and this adds unwarranted cost to the dump vehicle.

Even with robust cylinder design to resist bending moments, there is the important issue of the pivotable connections of the cylinder to the bed and to the chassis or other support structure. Ultimately, it is these connections that must carry not only the axial load from the cylinder, but also the bending moment introduced by side loads. For example, the hydraulic cylinder used to actuate the dump vehicle typically includes a cylinder pivot bearing or sleeve that is journaled around a cross shaft mounted in a support structure. Side or lateral loads placed on the cylinder are transmitted to the bearing, and over time, these loads tend to distort the bearing, resulting in a loose connection with the cross shaft. This loose connection results in the dump bed being unstable as it is raised or supported by the hydraulic cylinder.

SUMMARY OF THE INVENTION

The present invention discloses a dump vehicle comprising a chassis and a dump bed. The dump bed is pivotably mounted to the chassis and is movable between generally horizontal and inclined positions. A support structure secured to the chassis supports a cylinder that is pivotably attached thereto. The cylinder is operable between retracted and extended positions. A stabilizing structure is included for laterally stabilizing the cylinder as the cylinder moves between the retracted position and the extended position. In one embodiment, the stabilizing structure comprises a pair of arms with the telescoping cylinder extending generally between the arms. A retainer extends around the cylinder and is interconnected with the pair of arms.

The present invention also discloses a dump vehicle with a chassis and a dump bed pivotally mounted thereto and movable between generally horizontal and inclined positions. The invention includes a stabilizer mounted adjacent the cylinder for generally laterally confining the cylinder as the cylinder moves between retracted and extended positions.

The present invention further discloses a method of laterally stabilizing a cylinder utilized to actuate a dump bed on a vehicle chassis. The method comprises constraining the cylinder, connected between a support structure and the dump bed, to move in a plane that is generally perpendicular to the chassis. Constraining cylinder movement includes transmitting at least a portion of a lateral load imposed on the cylinder to a guide structure that is independent of the chassis and the dump bed.

Other objects and advantages of the present invention will become apparent and obvious from a study of the following description and the accompanying drawings which are merely illustrative of such invention.

DETAILED DESCRIPTION OF EXEMPLARY EMBODIMENT

Figure 1:
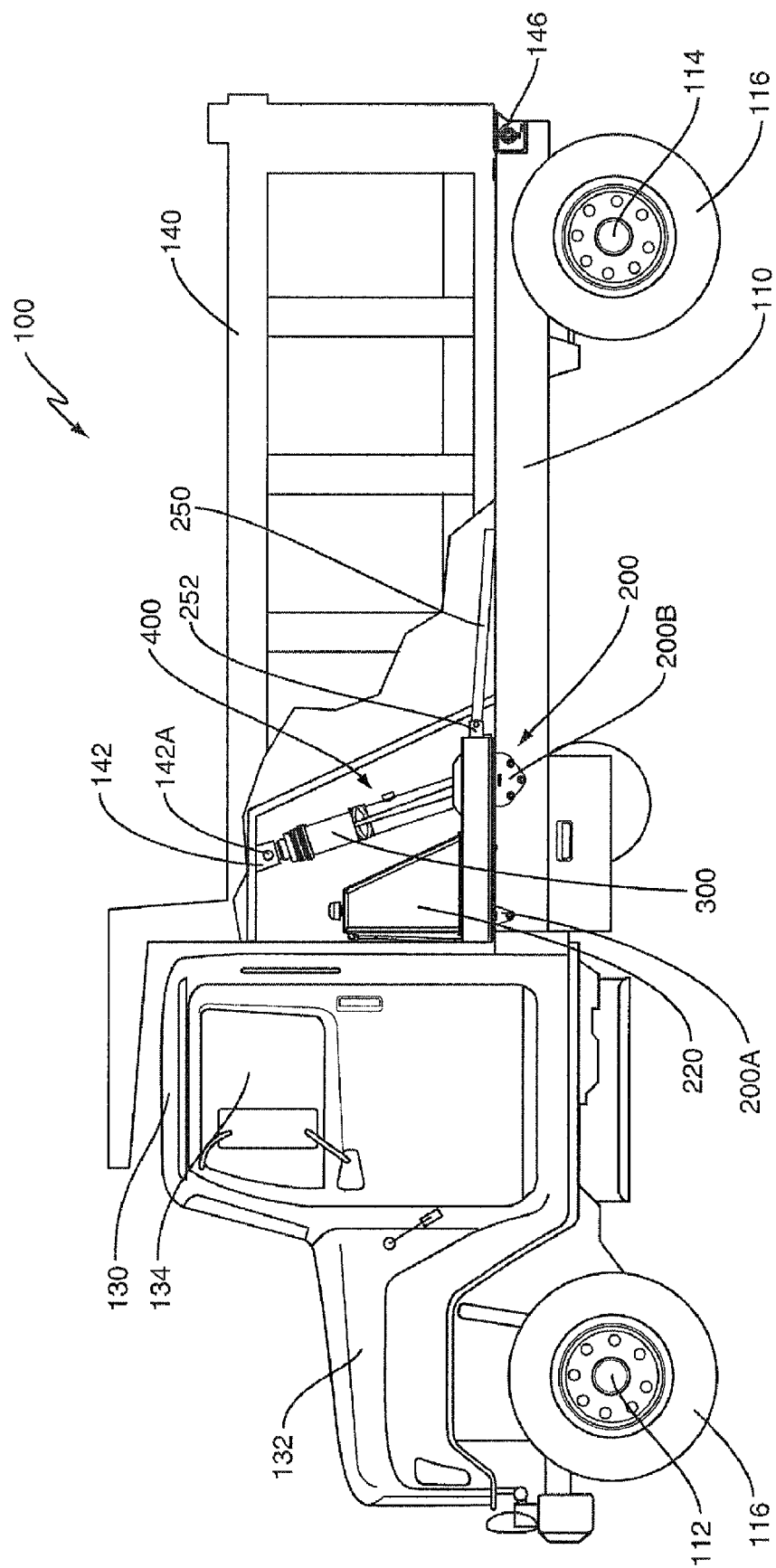
FIG. 1 is a side view of a dump truck.

The present invention is directed to a dump vehicle, a typical example of which is the dump truck shown in FIG. 1 and indicated generally by the numeral 100. Dump truck 100 is a wheeled vehicle comprising a chassis 110 mounted on at least front and rear axles 112, 114. Wheels 116 support dump truck 100 and provide locomotive traction for the dump truck. A cab 130 is disposed on a forward portion of chassis 110, and the cab is adjacent an engine compartment 132. Cab 130 includes an operator location and passenger compartment 134 which provides a protective environment for operators and passengers. Dump bed 140 is pivotably mounted on chassis 110 by a hinge 146 disposed on a rearward portion of the chassis. Dump bed 140 includes a bin 140A in which to load materials to be hauled by dump truck 100. See FIG. 2.

Figure 2:
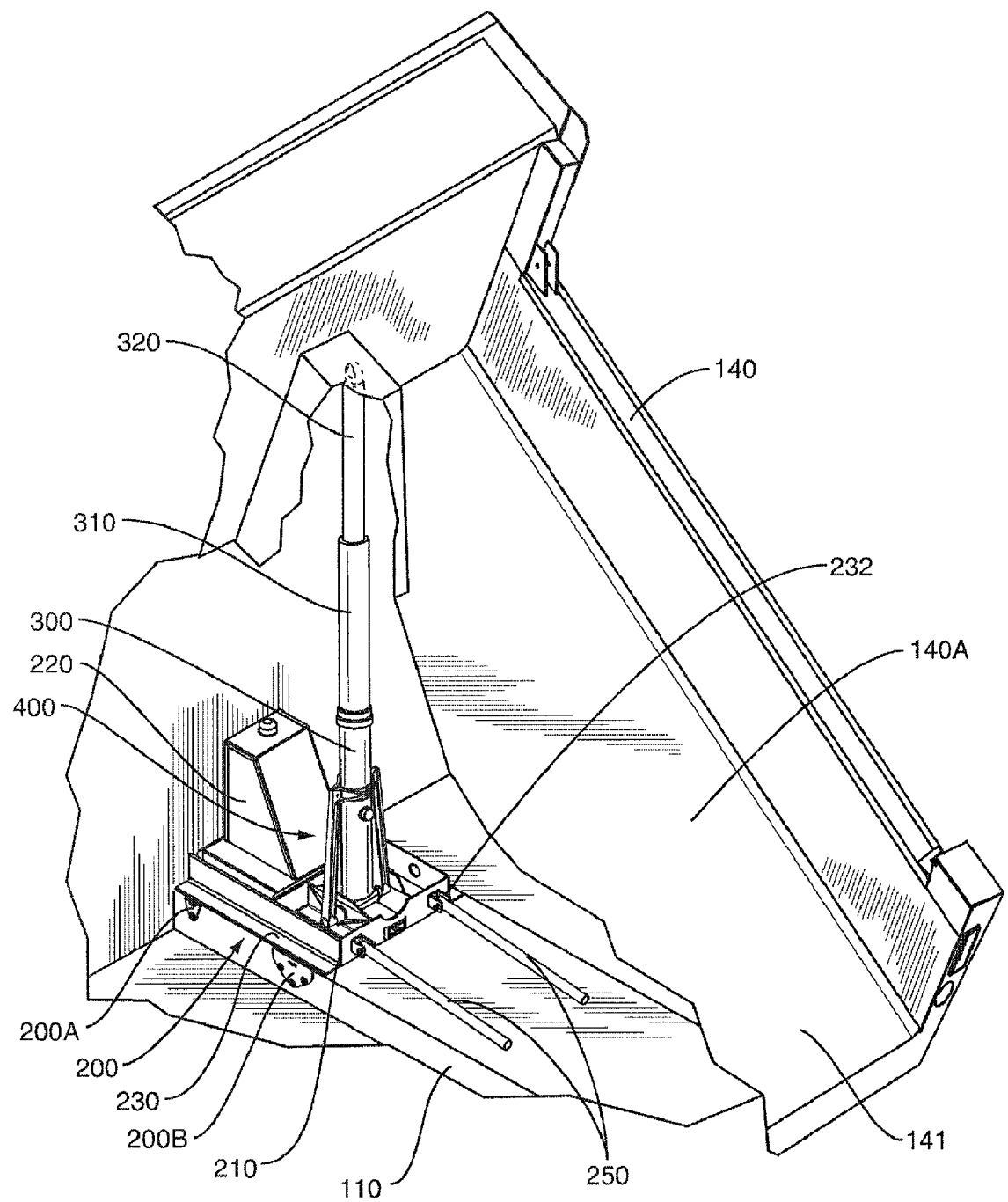
FIG. 2 is a fragmentary pictorial view of a dump bed shown in a tilted configuration.
Figure 3:
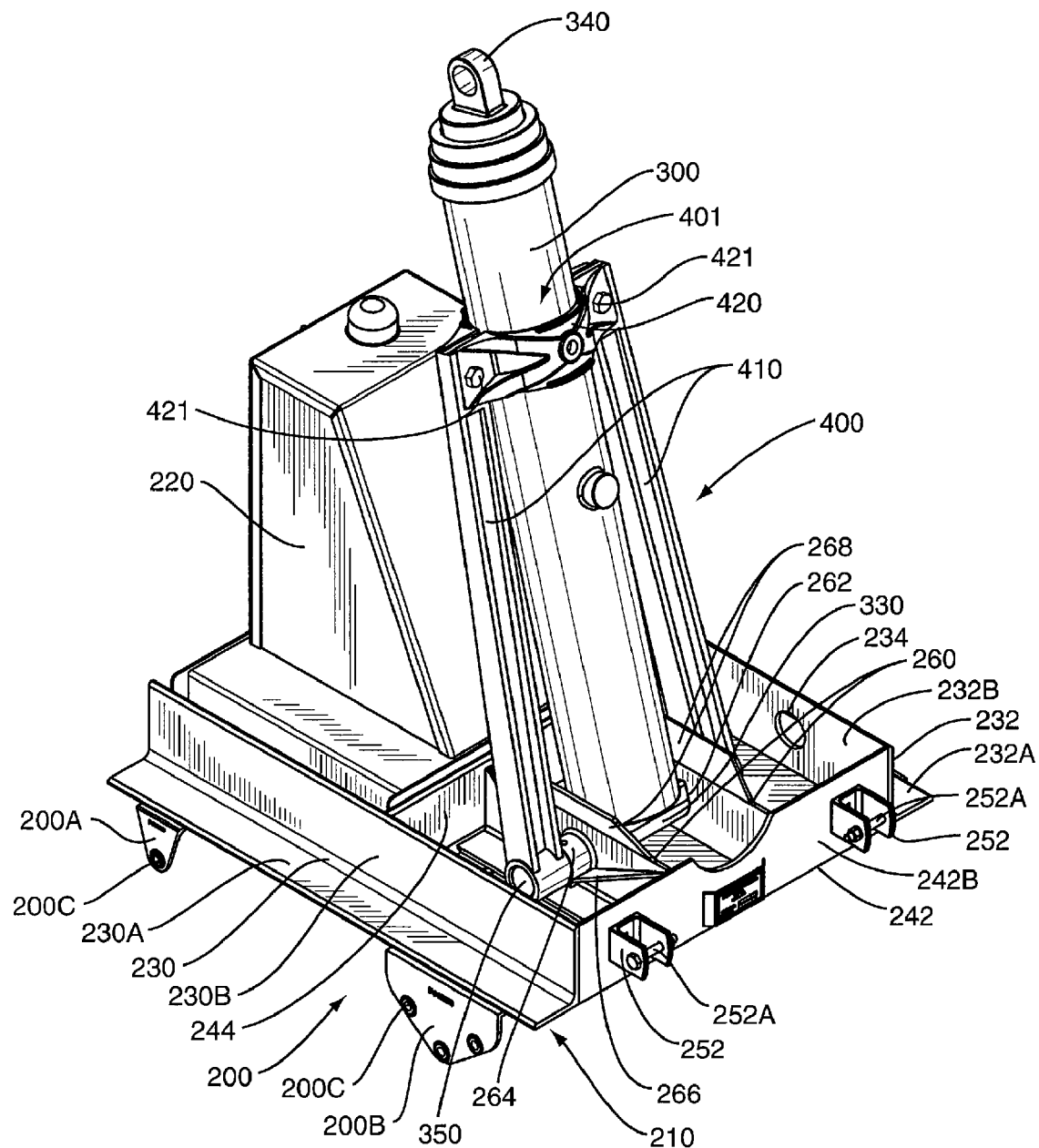
FIG. 3 is a pictorial view illustrating a telescoping cylinder for actuating the dump bed and a stabilizer for stabilizing the telescopic cylinder.

Turning now to more particular aspects of the present invention, a support structure 200 is mounted on chassis 110. In one embodiment, the support structure 200 is a subassembly that is mounted on the chassis 110. However, the support structure 200 can be an integral part of the vehicle chassis. As shown in FIGS. 2 and 3, support structure 200 includes a generally rectangular base weldment having a hydraulic reservoir 220 and a telescoping cylinder 300 disposed thereon. While hydraulic reservoir 220 is not necessarily disposed on support structure 200, when the reservoir is a part of a hydraulic system dedicated solely to actuating cylinder 300, a typical design may locate the reservoir on the support structure. More particularly, support structure 200 includes a pair of spaced apart longitudinal frame members 230, 232 welded to two spaced apart transverse frame members 242, 244. See FIG. 3. In one embodiment, one or more of frame members 230, 232, 242, 244 may be formed from hot rolled steel angle having horizontal and vertical flanges indicated, for example, by the numerals 230A, 230B in FIG. 3. Note, as shown in FIGS. 2 and 3, that horizontal flanges 230A and 232A are turned outwardly.

In one embodiment, support structure 200 is secured to chassis 110 with chassis mounting brackets 200A, 200B welded on the underside of flanges 230A, 232A. Holes 200C disposed as shown in FIGS. 2 and 3 on brackets 200A, 200B align with holes drilled in chassis 110 and allow support structure 200 to be bolted to chassis 110.

Brackets 252 are welded to rear-facing flange 242B of transverse frame member 242. Safety supports 250 are connected by pivot pins 252A to support brackets 252 as shown in FIGS. 1 and 2. In a typical operation, safety supports 250 are supported on chassis 110 when not in use. With dump bed 140 inclined, safety supports 250 may be pivoted upward to engage receptacles (not shown) formed in or welded to an underside of the dump bed 140 to support the bed during repair and maintenance procedures.

Turning now to the cylinder pivot structure for pivotably connecting cylinder 300 to support structure 200, the cylinder pivot structure includes a pair of interior, spaced-apart, longitudinal brackets 260 secured between transverse members 242 and 244. In one embodiment brackets 260 may be formed using hot rolled angle steel similar to that used for the frame members 230, 232. Each bracket 260 has an opening 262 disposed in a vertical flange of bracket 260 such that the openings in the pair of brackets are aligned. A bearing sleeve 264 is aligned with each opening 262 on the pair of brackets 260 and secured thereto. One or more ribs are secured to each bearing sleeve 264 and bracket 260 to reinforce the cylinder pivot structure. Members 268 extend angularly from brackets 260. An access opening 234 is provided in flange 232B of transverse frame member 232 to permit inserting cylinder pivot shaft 350 as will be described here below.

Figure 4:
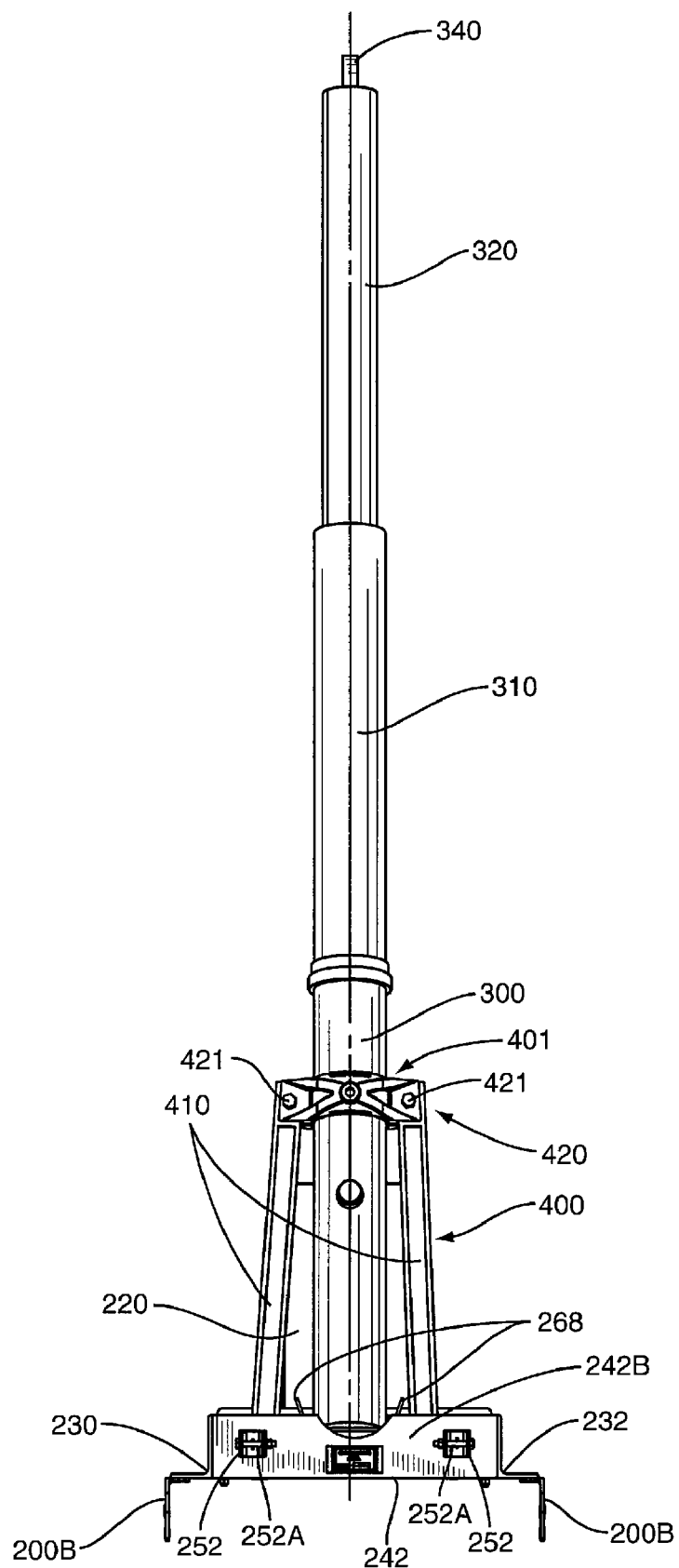
FIG. 4 is an elevational view illustrating the stabilizer and its relationship with the telescoping cylinder.

Telescoping cylinder 300 comprises, in one embodiment a cylinder connector bearing or sleeve 330 and a rod connector bearing 340. Telescoping cylinder 300 further comprises one or more interior cylindrical elements 310 adapted to sealably slide within the cylinder and a cylinder rod 320 (FIG. 2) adapted to slide sealably within the innermost cylindrical element 310. It is appreciated that when, in one embodiment, hydraulic oil is pumped into the interior of telescoping cylinder 300, cylinder rod 330 and cylindrical elements 310 extend telescopically as shown in FIGS. 2 and 4. The use of telescoping cylinder 300 in dump vehicle 100 provides, at least, the advantages of a stable structure with high resistance against buckling and bending as well as a compact retracted profile.

As discussed below, stabilizer 400 is disposed adjacent cylinder 300 and moves back and forth therewith as the cylinder is extended and retracted. Lateral loads experienced by the cylinder 300 are transferred to the stabilizer 400, which in turn transfers the lateral loads to support structure 200.

Figure 5:
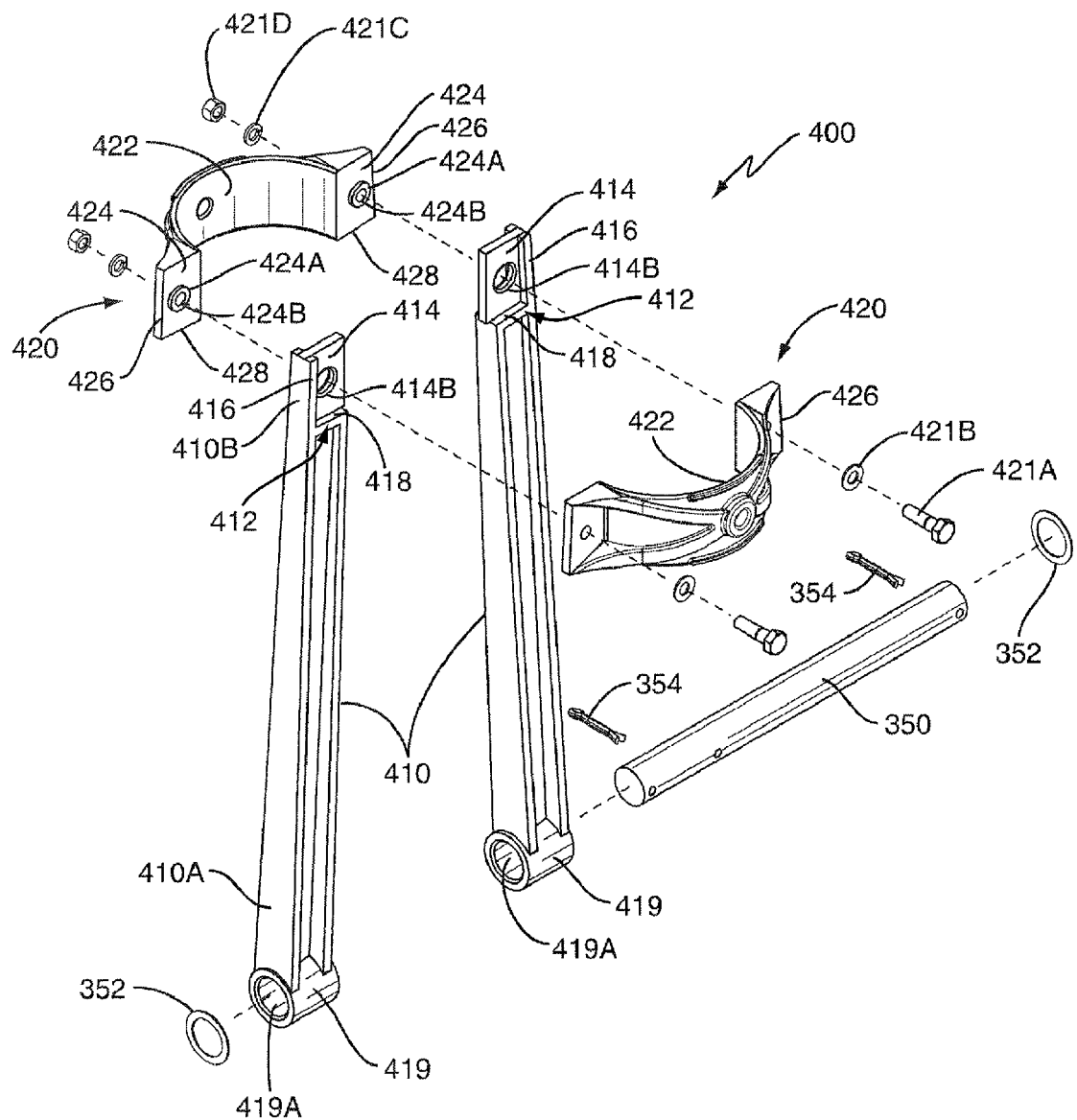
FIG. 5 is an exploded pictorial view of one embodiment of the stabilizer.

Stabilizer 400 includes a pair of angled arms 410 and a retainer 401. Each arm 410 includes a lower end portion 410A and an upper end portion 410B. Each arm is tapered such that the arm becomes progressively smaller in cross-section from lower end portion 410A to upper end portion 410B. See FIG. 5. Arms 410 are transversely aligned with cylinder 300 and extend generally downwardly and outwardly relative to the cylinder, as shown in FIGS. 2, 3, and 4. Lower end portions 410A are pivotably connected to support structure 200 as will be described in more detail below. Upper end portions 410B are disposed adjacent cylinder 300 and are connected to retainer 401, which extends around the cylinder. Included on each upper end portion 410B is a receiver, indicated generally at 412, adapted to receive and connect to a portion of retainer 401. Receiver 412 includes a web 414, first flange 416, and second flange 418. Web 414 includes an opening 414B for securing retainer 401 as will be described herein.

Each arm 410 includes a bearing sleeve 419 disposed on lower end portion 410A for pivotably mounting the arm onto shaft 350. It is appreciated that each bearing sleeve 419 is angled relative to its respective arm 410 consistent with the angulation of the arms as described above.

Retainer 401 comprises a pair of yokes 420. Each yoke 420 comprises a generally curved portion 422 and two faces 424. See FIG. 5. Curved portions 422 form generally semi-circular sections. Faces 424 are disposed on opposite ends of curved portion 422 and are disposed generally perpendicular to the curved portions. Each face 424 includes a boss 424A formed thereon and an opening 424B that extends through the face and the boss. Each face 424 further includes first and second edges 426, 428 wherein the angle between the edges approximately matches the angle between flanges 416 and 418 of receiver 412.

Figure 6:
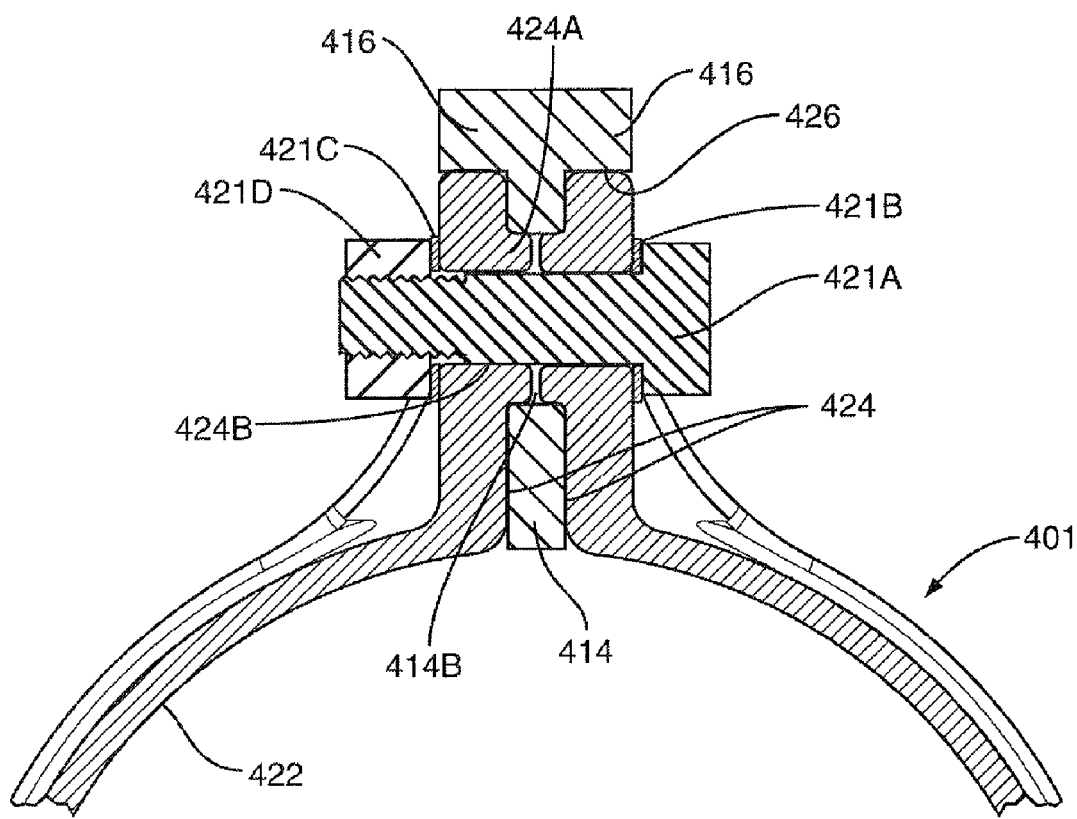
FIG. 6 is a fragmentary cross sectional view taken through a portion of the stabilizer.

Yokes 420 are disposed opposite each other such that opposing curved portions 422 form an opening for receiving and constraining cylinder 300 as shown in FIG. 3. The opening formed by yokes 420 is sized to provide a generally loose fit around cylinder 300. Faces 424 of opposed yokes 420 sandwich webs 414 of arms 410. See FIG. 6. Bosses 424A protrude into openings 414B such that in each opening, bosses projecting from faces 424 oppose each other and openings therein align. Further, edges 426 and 428 of faces 424 abut flanges 416 and 418 of receivers 412. Connector bolts 421A extend through openings 424B, and with washers 421B, 421C and nuts 421D, compressively secure yokes 420 to arms 410. It is appreciated that the engagement of bosses 424A with openings 414B and the engagement of edges 426, 428 with flanges 416, 418 provide secure connections between yokes 420 and arms 410 that protect bolts 421A from shear forces. In other words, bosses 424A and flanges 416, 418 carry a portion of the lateral load imposed on telescoping cylinder 300.

Telescoping cylinder 300 extends between the support structure 200 and dump bed 140. Cylinder connector bearing 330 is aligned and secured between brackets 260 with cylinder pivot shaft 350 inserted through the connector bearing. Cylinder pivot shaft 350 is inserted through access opening 234 and into bearing sleeves 264 and cylinder connector bearing 330. Washers 352 and cotter keys 354 may be inserted to secure cylinder connector shaft 350. In the embodiment illustrated herein, the shaft 350 is fixed in the support structure 200 and the arm 410 and cylinder 300 rotate about the transverse axis of the shaft. Portions of shaft 350 extend outwardly from brackets 260 to receive arms 410. Similarly, rod connector bearing 340 is pivotably connected to dump bed 140 with a rod connector bracket 142 disposed on the underside of the dump bed and a rod pivot pin 142A. See FIG. 1. Hydraulic connections from the hydraulic power system, including reservoir 220, are made to telescoping cylinder 300 by conventional means.

Stabilizer 400 is pivotably mounted on shaft 350 and pivots back and forth with telescoping cylinder 300. As seen in FIG. 3, lower end portions 410A of arms 410 are secured to the outer end portions of shaft 350 such that the stabilizer and telescoping cylinder 300 pivot about a common axis.

Considering now the operation of dump truck 100, and in particular the stabilization of cylinder 300 by stabilizer 400, it is appreciated that as cylinder 300 is extended, dump bed 140 moves from a generally horizontal position to an inclined position. As has been described heretofore, unevenly distributed loads in dump bed 140 and/or operation of dump truck 100 on uneven terrain may cause potentially destructive side loads to be applied to telescoping cylinder 300. These side loads tend to cause cylinder 300 to deflect laterally. This lateral deflection is potentially damaging to the rod connector bracket 142, rod connector pin 142A, telescoping cylinder 300, cylinder connector bearing 330, cylinder pivot brackets 260, and shaft 350. Stabilizer 400 absorbs and transmits portions of the side loads imposed on the cylinder 300 to the support structure 200, and the stabilizer constrains the cylinder to move in a generally vertical plane aligned with a longitudinal axis of chassis 110 thereby preventing damaging lateral deflection of the cylinder The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A dump vehicle comprising:
   a. a chassis having a longitudinal axis;
   b. a dump bed pivotably mounted on the chassis and movable generally between horizontal and inclined positions;
   c. a support structure secured to the chassis;
   d. a cylinder pivotably connected to the support structure and to the dump bed, the cylinder operable between retracted and extended positions; and,
   e. a stabilizing structure for laterally stabilizing the cylinder as the cylinder moves between the retracted position and the extended position, the stabilizing structure including:
   f a pair of arms with the cylinder extending generally between the arms;
   g. a retainer extending at least partially around the cylinder and interconnected with the pair of arms;
   h. wherein the arms are angled with respect to the cylinder; and
   i. wherein the retainer including two opposed members with each opposed member being secured to the pair of arms and extending across the cylinder; each member having a curved section that forms a part of an opening through which the cylinder extends.

2. The dump vehicle of claim 1 wherein the chassis includes a longitudinal axis and wherein the retainer is adapted to constrain the cylinder to move in a generally vertical plane that generally aligns with the longitudinal axis of the chassis.

3. The dump vehicle of claim 1 wherein the retainer comprises a pair of opposed yokes forming an opening between the yokes, and wherein the cylinder extends through the opening.

4. The dump vehicle of claim 1 wherein each arm includes a first end portion connected to the support structure and a second end portion connected to the retainer, and wherein the second end portion includes a receiver for receiving a face on the retainer.

5. The dump vehicle of claim 1 wherein each arm is pivotably connected to the support structure.

6. The dump vehicle of claim 1 wherein the arms and the cylinder are transversely aligned.

7. The dump vehicle of claim 6 wherein each of the arms are transversely aligned with a longitudinal axis of the cylinder.

8. The dump vehicle of claim 1 wherein the arms are angled with respect to the cylinder and extend generally downwardly and outwardly relative to the retainer.

9. The dump vehicle of claim 1 wherein each arm includes a cross-sectional area and wherein the cross-sectional area is larger at a first end portion of the arm than at a second end portion.

10. The dump vehicle of claim 1 wherein each arm includes first and second end portions and wherein the first end portion is adapted to be connected to the support structure and the second end portion includes at least one recessed receiver with an opening disposed therein.

11. The dump vehicle of claim 10 wherein the retainer includes at least one face adapted to abut one of the receivers.

12. The dump vehicle of claim 1 wherein the support structure includes a shaft, and wherein the arms and cylinder rotate about the axis of the shaft.

13. The dump vehicle of claim 1 wherein the support structure includes a pair of members that support a shaft that extends transversely with respect to the dump vehicle; and wherein the arms and cylinder are rotatively mounted about the axis of the shaft such that the cylinder is disposed between the arms.

14. The dump vehicle of claim 1 wherein the retainer comprises a pair of opposed yokes, with each yoke having pair of spaced apart faces, and with each face having a boss projecting therefrom; wherein each arm includes an opening formed therein; and wherein the yokes are secured to each arm by sandwiching a portion of each arm between the faces such that the bosses project at least partially into the openings formed in the arms.

15. A dump vehicle comprising:
a. a chassis;
b. a dump bed pivotably mounted on the chassis and movable generally between horizontal and inclined positions;
c. a support structure associated with the chassis;
d. a cylinder pivotably connected to the support structure and to the dump bed, the cylinder operable between a retracted position and an extended position;
e. a stabilizer mounted adjacent the cylinder for generally laterally confining the cylinder as the cylinder moves between retracted and extended positions;
f. the stabilizer including a pair of arms rotatively mounted about a transverse axis to the support structure such that the cylinder extends generally between the arms and a connecting structure interconnected between the arms and engaged with the cylinder when the cylinder experiences lateral loads such that the interconnecting structure and the arms absorb portions of the lateral loads imposed on the cylinder;
g. wherein the arms and a cylinder are rotatively mounted about a common transverse axis, and wherein the structure interconnected between the arms extends at least partially around the cylinder such that the cylinder and arms are constrained to move back and forth together; and
h. wherein the structure interconnected between the two arms includes two sections that are bolted to upper end portions of the arms, and wherein the two sections form an opening through which the cylinder extends.

16. The dump vehicle of claim 15 wherein the stabilizer is connected to the support structure and engages the cylinder.

17. The dump vehicle of claim 15 wherein the stabilizer includes a guide disposed adjacent the cylinder.

18. The dump vehicle of claim 17 wherein the guide comprises a retainer which extends at least partially around the cylinder.

19. The dump vehicle of claim 17 wherein the guide includes at least one movable arm.

20. The dump vehicle of claim 19 wherein the at least one arm is angled relative to the cylinder, extending downwardly and outwardly relative to the cylinder.

21. A dump vehicle comprising:
a. a chassis having a longitudinal axis;
b. a dump bed pivotably mounted on the chassis and movable generally between horizontal and inclined positions;
c. a support structure secured to the chassis;
d. a cylinder pivotably connected to the support structure and to the dump bed, the cylinder operable between retracted and extended positions; and,
e. a stabilizing structure for laterally stabilizing the cylinder as the cylinder moves between the retracted position and the extended position, the stabilizing structure including:
f. a pair of arms with the cylinder extending generally between the arms;
g. a retainer extending at least partially around the cylinder and interconnected with the pair of arms;
h. wherein the arms and the cylinder are transversely aligned; and
i wherein each of the arms are transversely aligned with a longitudinal axis of the cylinder.

\* \* \* \* \*